United States Patent [19]
White

[11] Patent Number: 6,151,431
[45] Date of Patent: Nov. 21, 2000

[54] COMPACT NON-BLOCKING NON-DILATED OPTICAL SWITCH USING MODE CONVERSION

[75] Inventor: Ian Arthur White, Dunwoody, Ga.

[73] Assignee: Lucent Technologies Inc., Murray Hill, N.J.

[21] Appl. No.: 09/198,660

[22] Filed: Nov. 24, 1998

[51] Int. Cl.[7] ...................................................... G02B 6/26
[52] U.S. Cl. ................................ 385/21; 385/16; 385/17; 385/20
[58] Field of Search .................................. 385/16, 17, 18, 385/19, 20, 21, 22, 23, 24, 30, 31, 50

[56] References Cited

U.S. PATENT DOCUMENTS

| | | | |
|---|---|---|---|
| 5,761,352 | 6/1998 | Kitajima et al. | 385/16 |
| 5,933,554 | 8/1999 | Leuthold et al. | 385/16 |
| 5,937,117 | 8/1999 | Ishida et al. | 385/24 |
| 6,002,818 | 12/1999 | Fatehi et al. | 385/17 |

*Primary Examiner*—Frank G. Font
*Assistant Examiner*—Roy M. Punnoose

[57] ABSTRACT

A non-blocking optical switch has a non-dilated architecture wherein dual mode input waveguides are connected to first and second inputs of mode selective couplers through mode conversion devices. Switching is effected by signals from a processing unit applied to a mode converter to convert the signal to be switched from a fundamental mode to a higher order mode. The mode selective coupler then couples the signal to one of the outputs thereof, whereas fundamental mode signals pass through to the other output thereof. An array of rows (layers) and columns of such elements make it possible to switch any incoming signal to be switched to any of a plurality of outputs after reconversion to the fundamental mode.

15 Claims, 4 Drawing Sheets

COMPACT NON-BLOCKING NON-DILATED OPTICAL SWITCH USING MODE CONVERSION

BACKGROUND OF THE INVENTION

1. Field of the Invention

The present invention relates to optical switching technology; more specifically, to a compact all optical switch utilizing mode conversion.

2. Description of the Prior Art

All optical switching is becoming a critical necessity for modern telecommunications based on optics. In order to accommodate the huge signal capacity made possible with optical signal transmission, the optical switch fabric needs to have a large range of input ports, from 2 to 50,000, in which each port can be switched to any of 2 to 50,000 outputs without interfering with other signals. Permitting multiple signals to be switched without interfering with other signals is referred to as a non-blocking arrangement. For this non-blocking function to be realized, the switch is usually dilated-which is accomplished by there always being, for each switch signal, a path within the switch that is separate from other signal paths. A dilated switch can necessitate a total switch size that is so large that it is substantially impossible to fabricate on typical integrated optics wafers or via bulk optics. The switch is described as "dilated" because the path separation requirement results in the maximum total number of waveguide paths in the cross section of the switch, at the midpoint of the switch, to be $2^{2N}$ between which the paths must be connected where N is the total number of waveguide paths. Since these paths can be displaced from each other by $2^{2N}$ (waveguide spacing), large directional changes in the waveguide from the straight paths must be accommodated in the planar surface. This consumes a large amount of valuable wafer space. Thus, for a $2^{2N} \times 2^{2N}$ switch, a total of $2^{N+1}(\Sigma_{N=1} 2^N)$ $\{=2^{N+1}(2^N-1)\}$ "1×2" switches are needed. For example, a 256×256 switch requires 130,560 "1×2" switches. At present, a typical switch cost for a "1×2" switch is hundreds of dollars, so a 256×256 switch could cost more than several million dollars. Furthermore, the cost of a non-blocking switch increases as the square of the number of input ports which would make a 50,000 port device approximately 40,000 times as expensive as the 256×256 switch. Even allowing for a very optimistic projection of cost reductions so that the per port cost decreases by a factor of 100, to a few dollars per switch, the switch components alone would prohibit the development of such a device with an intrinsic cost in the billions. Undoubtedly integrated optics fabrication will eventually greatly reduce the per port costs for switches, but the need for a dilated switch design inherently limits the size of such devices. This limitation is not due to the size of the switch elements, but the size of the cross connect region between switch halves which has to be large to allow low loss transitions between all ports. Depending on the switch size, typical wafers of 5 to 6 inch diameters are generally limited to 16×16 devices and cost several thousand dollars per port. Thus, this solution is no different than present bulk optic solutions and nowhere near the few dollars per "1×2" switch cost described in the foregoing.

SUMMARY OF THE INVENTION

The present invention overcomes the problem of dilation described above so that much more compact non-blocking switches can be made. This breakthrough enables larger capacity non-blocking switches to be manufactured economically; therefore, the obstacle of optical switching and its limiting effects on optical communication are overcome.

The compact switching arrangement of the invention employs a network of mode selective optical circuits. Each of the optical circuits has two individual dual mode waveguides with input and output ends. A mode selective coupler permits high order mode optical signals to cross couple between the two waveguides that are optically coupled to the mode selective coupler while allowing fundamental mode signals to pass therethrough uncoupled. Each waveguide has a mode converter which is located along the waveguide in advance of each mode selective coupler for converting the signals to a higher order mode upon command from a CPU, for example.

The mode converters can, for example, comprise periodic gratings which convert optical signals from their fundamental mode to a higher mode when it is necessary to switch the optical signal between waveguides. Only the higher order modes are capable of coupling between the waveguides in the mode selective coupler, but the optical signals in their fundamental mode remain on the same waveguide. The capability of switching is greatly enhanced by the multiple modes because two different optical signals can propagate along the same waveguide at the same time without interfering with each other. Furthermore, a programmed computer controlling device (CPU) can route signals in the same mode along different paths until one of the signals can be converted to a different mode to allow the signals to pass. This feature ensures that an optical signal can always find a pathway to any port without inhibiting one port from getting to another. Thus, as will be apparent hereinafter, the switching arrangement of the invention can overcome potential blockages without dilation.

In order that optical signals do not interfere or crosstalk with each other, each mode selective optical circuit has a clean-up device, such as a filter, on each waveguide after the mode selective coupler to remove any non-mode converted energy. The filters operate as periodic gratings tuned to a different wavelength than the mode converters. The periodicity of the gratings can be changed upon command from the CPU, thus making it possible to cause any residual optical power to radiate away from the waveguide.

The optical switch is configured by placing a multitude of optical circuits in a staggered diagonal arrangement between the multitude of input and output waveguides to form layers of waveguides. This arrangement results in a multiple number of layers that is equivalent to the total number of inputs and outputs.

This structure of staggered diagonal optical circuits permits optical signals to be switched between different waveguides more efficiently than in previous designs because fewer switches are required to route the optical signals to the destination waveguide and, hence, fewer individual waveguides in a cross-connect region. Previous designs use dedicated waveguides to provide an optical connection between each input and output. The result of this configuration, as pointed out hereinbefore, is that the entire switch is very large due to the number of waveguides and switches, whereas the switch of the present invention occupies less wafer space than does a design that uses path separation techniques with the same number of inputs. The present invention presents a more economic solution to optical switch manufacturing so that switches with a greater number of inputs and outputs can now be feasibly marketed. As a result, the present invention will permit the continued growth and development of optical communication networks.

DETAILED DESCRIPTION OF THE INVENTION

Figure 1:
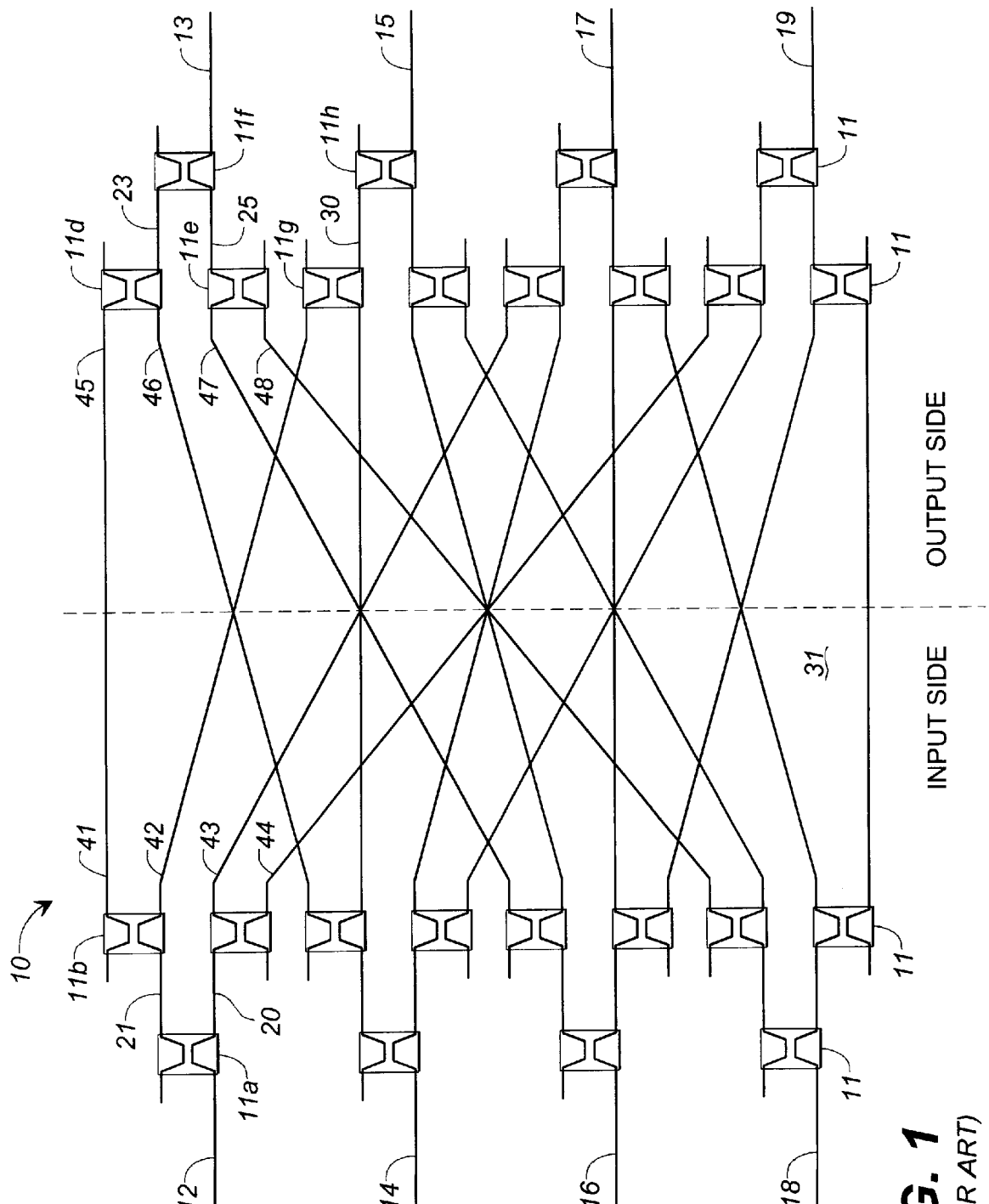
FIG. 1 illustrates a typical prior art 4×4 dilated non-blocking optical switch composed of "1×2" switches.

FIG. 1 illustrates the current technology architecture required to construct a 4×4 non-blocking integrated optical switch 10. The switch 10 is comprised of twenty four (24) identical "1×2" switches 11. Planar waveguides 12, 14, 16, and 18 serve as input paths to the switch 10. Each of the planar waveguides 12, 14, 16 and 18 is optically coupled to one of a first set of "1×2" switches 11.

Figure 2:
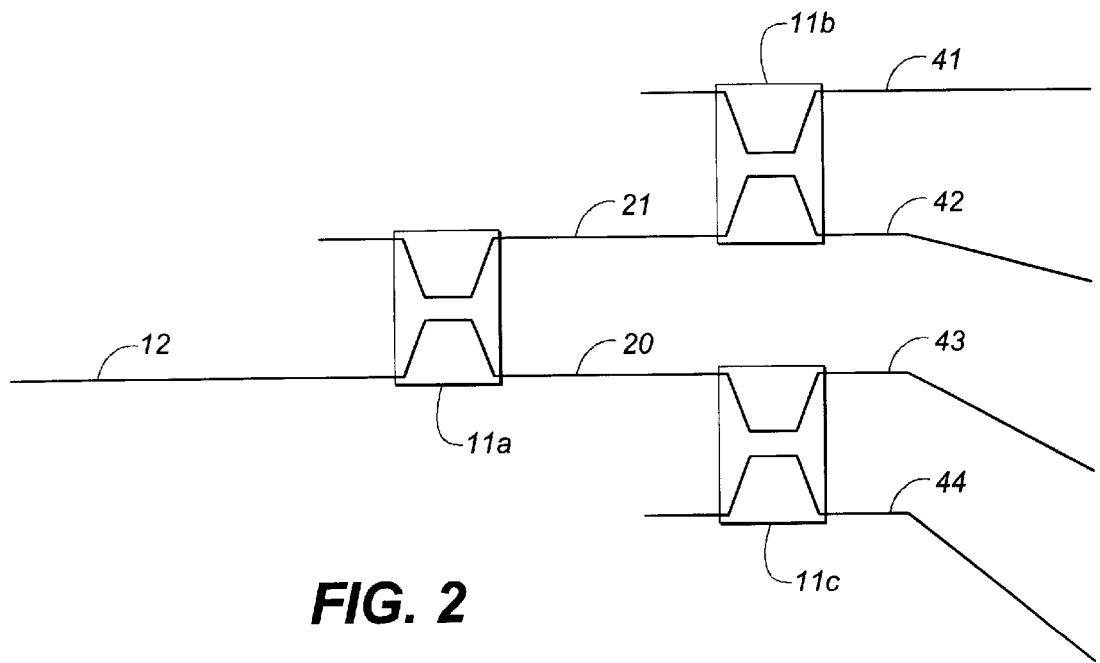
FIG. 2 illustrates the required path separation for a single input on the 4×4 dilated non-blocking optical switch composed of "1×2" switches of the type illustrated in FIG. 1.

Each of the two outputs 20 and 21 from the first set of "1×2" switches 11 is optically coupled to a second set of "1×2" switches 11 also having two outputs. FIG. 2 details an excerpted portion of FIG. 1 and illustrates the required path separation for a single input. Input planar waveguide 12 is coupled to "1×2" switch 11a. One of the outputs 21 from "1×2" switch 11a is optically coupled to "1×2" switch 11b, and the other output 20 is optically coupled to "1×2" switch 11c. Thus, the signal on input planar waveguide 12 can be routed to one of four outputs 41, 42, 43 or 44 from "1×2" switches 11b and 11c as shown in FIG. 2. This arrangement is necessary in FIG. 1 because planar waveguide 12 and the switches 11 must be capable of routing an optical signal to any of the output planar waveguides 13, 15, 17, or 19. Thus, a planar waveguide 12 must be separated into four separate potential paths as depicted in FIG. 2. This arrangement is called path separation, and must be configured for each individual input and output.

Figure 3:
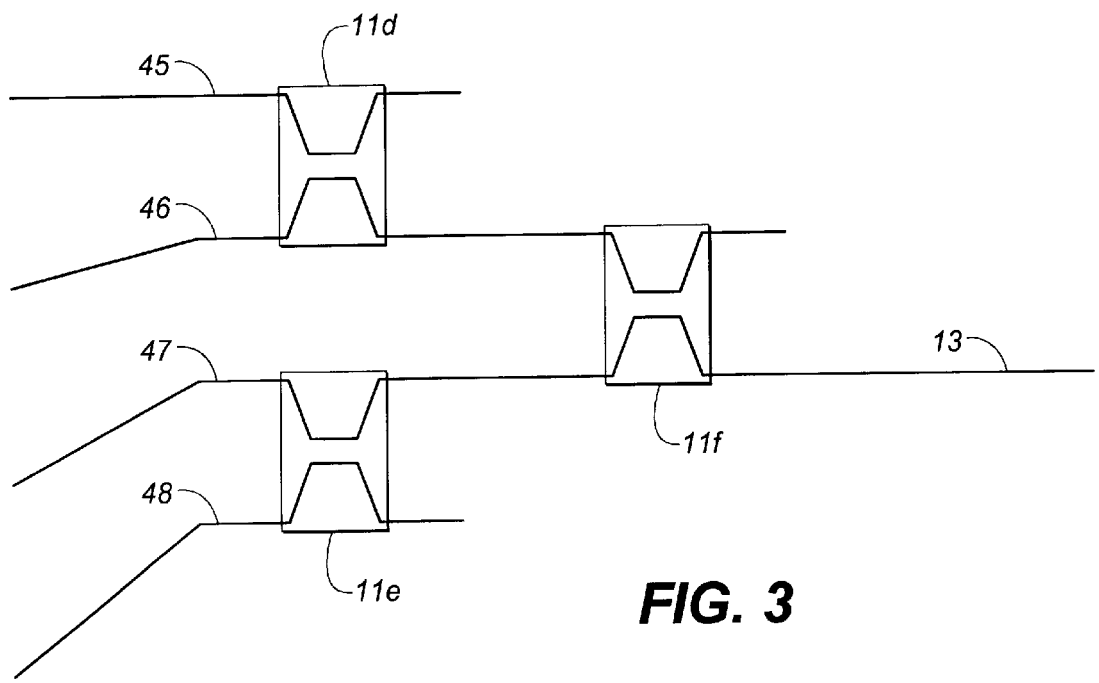
FIG. 3 illustrates the path convergence for a single output a 4×4 dilated non-blocking optical switch composed of "1×2" switches of the type illustrated in FIG. 1.

Each of the outputs from the second set of "1×2" switches is coupled to an individual planar waveguide 41, 42, 43, and 44 that routes across the cross section 31 to the output side of the switch 10. FIG. 3 depicts a excerpted portion of FIG. 1 and illustrates the path convergence for a single output. Four planar waveguides, which correspond in function to the four input waveguides 12, 14, 16 and 18 in FIG. 1, traverse the cross section 31 and are optically coupled to two "1×2" switches 11d and 11e at four separate input points 45, 46, 47, and 48. One optical output 23 from a "1×2" switch 11d and one optical output 25 from a "1×2" switch 11e are optically coupled to a "1×2" switch 11f. The optical output from "1×2" switch 11f is optically coupled to output planar waveguide 13 which exits the switch 10. This arrangement is necessary because the planar waveguide 13 must be capable of accepting optical signals from any of the four input waveguides 12, 14, 16, or 18. FIG. 3 depicts a reverse form of path separation, or path convergence wherein four distinct waveguides are combined into one.

In operation, the switch 10 in FIG. 1 routes optical signals to the correct output without blocking any other signal that may also be routed through the switch. For example, for the switch 10 to route an optical signal from input path 12 to output path 13, the optical signal would take the following course: (1) the optical signal entering switch 10 on planar waveguide 12 would cross couple in a first "1×2" switch 11a onto planar waveguide 21; (2) then the signal would be routed into a second "1×2" switch 11b where it would cross couple onto planar waveguide 41; (3) the optical signal would traverse the cross section 31 from the input side to the output side of the switch 10, enter a third "1×2" switch 11d and cross couple onto waveguide 23; and finally, (4) the optical signal would cross couple in a fourth "1×2" switch 11f onto output planar waveguide 13 and exit switch 10. On the other hand, if switch 11b is actuated, its output is to waveguide 42, which inputs to switch 11g and in turn to switch 11h on guide 30.

The cross coupling function is accomplished by a higher order intelligence device such as a CPU by, for example, the application of heat to the substrate region between the two planar waveguides within the switch. This heating effect can change the refractive index of the substrate region so that the optical power either remains in the same waveguide or is transferred to the other waveguide within the switch. Heating is typically accomplished by the application of an electric field to the substrate such that the refractive index changes to a factor that permits optical signals to cross couple. Other types of mechanism that change refractive index or phase known in the art may also be used.

The switch 10 in FIG. 1 is described as "dilated" because of the required path separation to accommodate the total number of input 12, 14, 16, and 18 and output 13, 15, 17, and 19 ports as previously described. This required separation of paths results in a predetermined maximum total number of waveguide paths in the cross section 31 of the switch between which the paths must be coupled to each output waveguide. At the midpoint of the switch 10, a total number of sixteen (16) waveguides in the cross section 31 must be connected between the input and output side of the switch 10. If the spacing between the waveguides in the cross section 31 is 250 microns, the maximum transverse distance to be crossed is approximately 4 centimeters. Thus, typical wafers of 5 to 6 inches in diameter are limited to 16×16 switches because the large directional changes in the waveguides from the straight paths must be accommodated in the planar surface. To construct a larger switch, such as a 256×256, the cost of the number of large volume of required elements render the development of such a switch unfeasible. The limitation of path separation which creates dilated switches would force the switch to be manufactured on many wafers, and as a result, be cost prohibitive.

Figure 4:
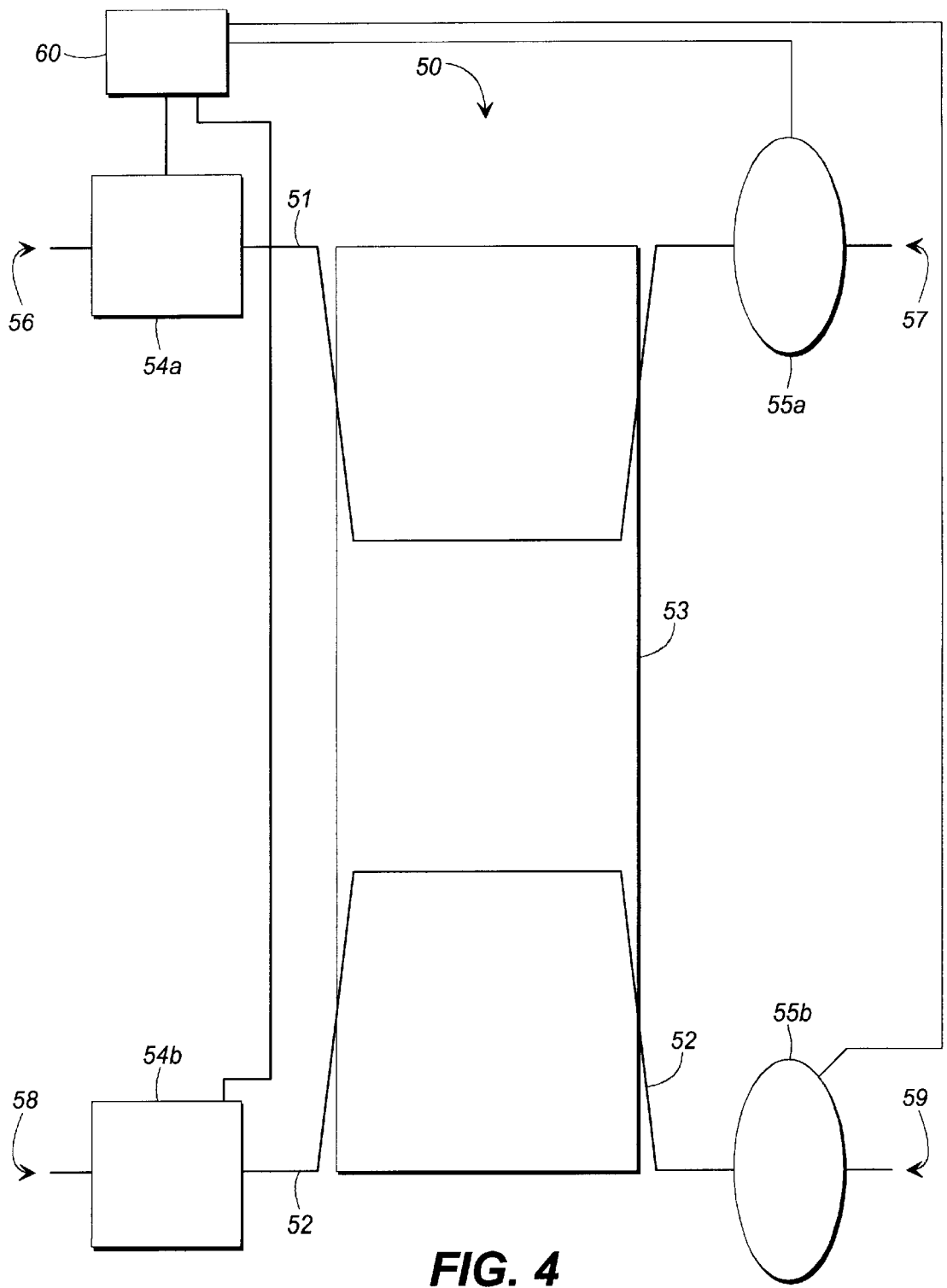
FIG. 4 illustrates a single optical circuit for cross coupling as used in the present invention.

In contrast, the present invention is not plagued by the problem of dilation as described above. Because the present invention does not utilize a dilated design, it is much more compact and less expensive to manufacture. FIG. 4 illustrates the central element of the present invention that allows fabrication of a more compact non-dilated and non-blocking optical switch than that depicted in FIG. 1. The basic optical circuit 50 of the present invention is shown in FIG. 4 and comprises two waveguides 51 and 52 that can optically couple in a mode selective coupler 53 which may take any of a number of forms known in the art. A mode converter 54a is disposed along waveguide 51 between the mode selective coupler 53 and the optical input to the switch 56. A second mode converter 54b is disposed along waveguide 52 between the mode selective coupler 53 and the optical input to the switch 58. The waveguides 51 and 52 are sufficiently close so that optical signals of particular modes can be coupled from one waveguide to the other. Mode converters 54a and 54b are under control of the central processing unit 60 or other programmed device.

In operation, the optical circuit 50 depicted in FIG. 4 routes input optical signals to the correct output path. Input optical signals enter the switch on either of the two waveguides 51 and 52. A mode converter 54a and 54b is used to change the optical signal from the fundamental mode in the waveguide 51 or 52 to a higher mode under command of the processing or switching unit 60. After this conversion, the higher mode optical signal can be efficiently cross coupled in the mode selective coupler 53 to the other waveguide path and then on to the next mode selective coupler.

Transformation of optical signals from their fundamental mode to a higher mode can be initiated by a variety of methods and embodiments. In one embodiment, a periodic grating, or resonant coupling phenomenon, can cause optical energy to change from one propagation state to a higher propagation state at the mode converter 54a or 54b. This embodiment takes advantage of the theory of sound controlling light. Sound waves can modify the refractive index of an optical medium thereby to create a periodic grating within the waveguide to cause optical signals to convert to other modes. This is known as an acoustic-optic effect. Some acoustic optic modulators makes use of the fact that the intensity of reflected light is proportional to the intensity of sound. Modulators are controlled by the higher order intelligence device such as a CPU 60 which routes a path for each optical signal to follow. The CPU 60 causes sound waves which create a standing wave within the waveguide. This standing wave creates varying pressures within the waveguides which, in turn, creates smaller index variations along the waveguides' axis-a periodic variation index.

Another embodiment (not shown) of periodic grating is accomplished by fabricating a series of periodic core diameter variations. Both thermal or mechanical methods sufficiently expand the gratings to obtain the correct spatial dependence to cause coupling. This technique is also known in the prior art.

Yet another embodiment entails placing optically sensitive material near the core of the waveguide. Then a light of varying intensity is introduced on the material. The index of the material changes with the intensity of light shown on it, and this creates a refractive index variation that is periodic along the waveguide.

In any of the foregoing, the net result is conversion of the signal energy from a fundamental mode to a higher order mode.

Still another is to fabricate using a material that is electro-optically sensitive to index changes under electric fields. This can produce speeds of 10 to 20 gigabits per second.

An optical signal that is converted to a higher mode will efficiently cross couple to the other waveguide within the mode selective coupler 53. The mode selective coupler 53 is used because it does not efficiently couple the fundamental mode optical signal to the other waveguide and thus is selective in its action. Optical signals in their fundamental mode do not cross couple but remain on the same waveguide upon which the optical signal entered the optical circuit. Thus, by controlling the periodic gratings in the waveguides paths, i.e., controlling the mode converting action, it is possible to operate the optical circuit 50 to direct an optical signal onto the intended waveguide by converting the optical signal into a higher mode when switching is desired and allowing the optical signal to remain in its fundamental mode when switching is not desired.

Disposed on the waveguides 51 and 52 in FIG. 4 are "signal clean-up" devices 55a and 55b respectively that allow the optical circuit 50 to be actively tuned to achieve good "extinction ratio." The tuning occurs after the optical signal passes the mode selective coupler 53 but in advance of the output 57 or 59 to the optical circuit 50. A variety of embodiments can adequately perform the function of eliminating any leftover energy that is not coupled onto the other waveguide within the mode selective coupler 53. One particular embodiment is a clean-up filter 55a or 55b which removes all non-mode converted or unwanted, hence extraneous energy that could create cross talk. The filters 55a or 55b operate on periodic gratings tuned to a different wavelength than the mode converters 54a or 54b. By changing the period of the gratings under control of CPU 60, it is possible to cause any residual optical power to radiate away from the waveguide, thereby eliminating a crosstalk problem.

Once the optical signal has been routed onto the proper waveguide 51 or 52 and has traveled beyond clean up filter 55a or 55b, the optical signal exits the optical circuit through optical outputs 57 or 59 without any non-mode converted energy remaining on the original waveguide.

Figure 5:
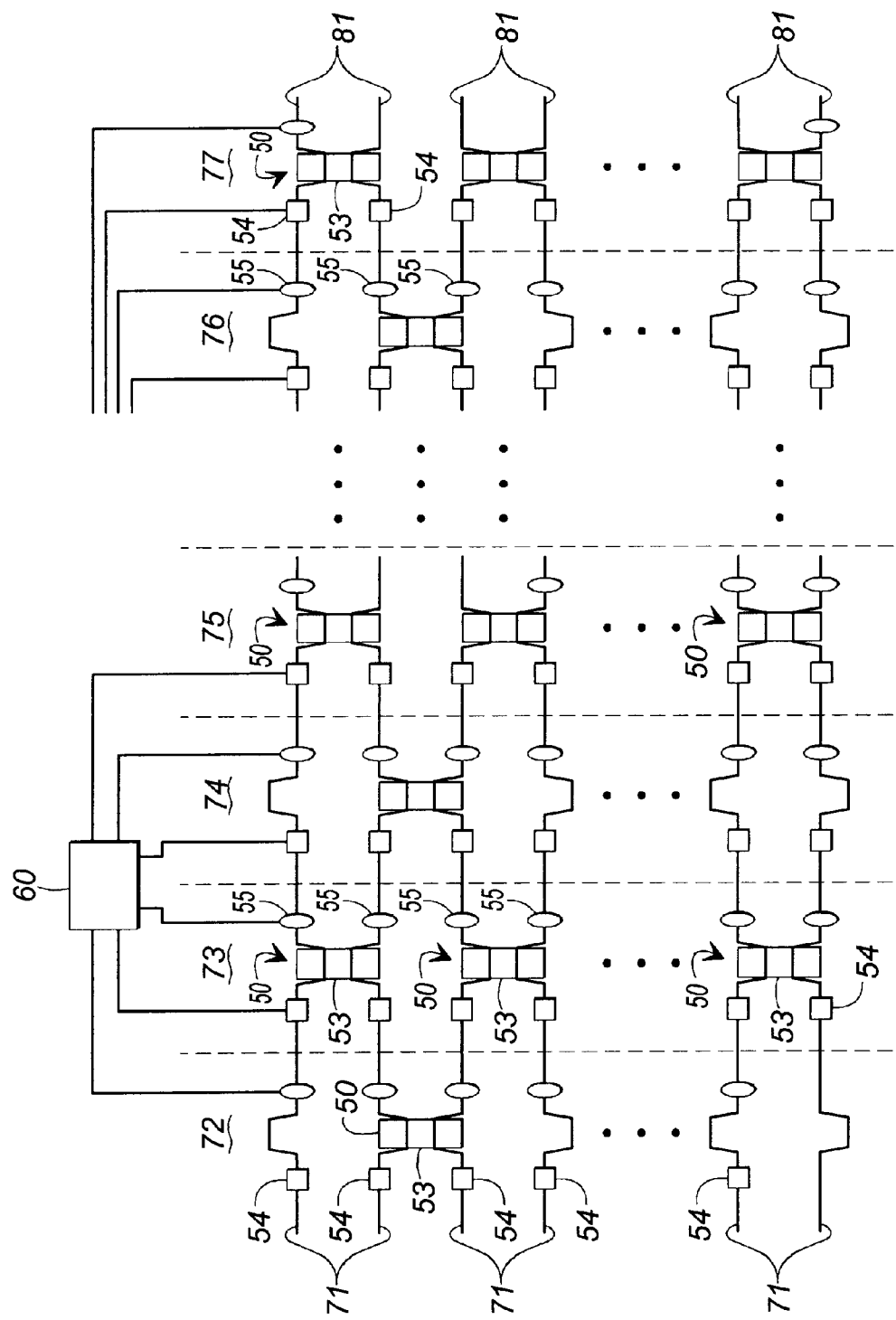
FIG. 5 illustrates a compact non-blocking non-dilated optical switch using mode conversion.

FIG. 5 illustrates a fabrication of an array of the individual optical circuits 50 shown in FIG. 4. In FIG. 5, a plurality of optical inputs 71 create a plurality of layers of waveguides which traverse the switch 70 to a plurality of optical outputs 81. The optical inputs 71 are optically coupled to a plurality of optical switches 50 arranged in a diagonal and staggered pattern between the optical inputs 71 and the optical outputs 81. As can be seen in FIG. 5, each input is connected through a mode converter 54 to one of the inputs of a mode selective coupler in either the first column 72 or the second column 73. The number of columns 72–77 of optical circuits 50 either equal or is one less than the number of optical inputs 71 so that any single optical input 71 can route to any single optical output 81.

In operation, optical switch 70 accepts optical signals on any of the plurality of optical inputs 71. The higher order intelligence device or CPU 60 (not shown), such as a CPU, traces the correct path to route the optical signal to the destination waveguide that is one of the plurality of optical outputs 81. When it is necessary to cross couple an optical signal to a different waveguide, the higher order intelligence device activates a mode converter 54 to change the optical signal from its fundamental mode in the waveguide to a higher mode which can cross couple within the mode selective converter 53. Once an optical signal has been converted to its higher mode and cross coupled to a different waveguide from which it entered the optical circuit 50, it will continue to cross couple to other waveguides at other optical circuits 50 that are disposed in subsequent layers until the higher mode optical signal is converted back to its fundamental mode by a second mode converter 54. Each optical signal that must be routed to a different output waveguide from its input waveguide interacts with a maximum number of two active mode converters 50—one to initiate the first path change and another to stop further path changes at the destination waveguide path.

The ability for an optical signal to be converted to another mode permits the optical switch 60 to be non-blocking—all optical signals have a direct path to the destination waveguide. The optical switch 60 even permits optical signals in the fundamental mode and optical signals in the higher order mode to simultaneously utilize the same waveguide. Moreover, the higher intelligence device routes signals in the same mode in different directions or converts one to another mode if their paths must cross. The result of this configuration is that optical switch 70 permits all incoming optical signals to route through the optical switch 70 without interference. An added benefit of the configuration shown in FIG. 5 is that where a path may be blocked, an alternate signal path may be configured under control of unit 60.

In an optical switch 70 as depicted in FIG. 5, the number of optical circuits 50 grows linearly with the input port count 71. There is no need for a cross connect region as in FIG. 1 because the individual optical circuits 50 can easily accomplish both cross connect and fabric due to the bimodal switching behavior. This feature allows fabrication of larger optical switches on a single substrate due to the non-dilated nature of the optical switch 70. High delta waveguides are utilized to ensure that the mode converter size is small in length to enable large numbers of optical switches to be optically coupled along a waveguide. A benefit from this compact non-dilated optical switch 70 is that it is a much less costly switch than the optical switch 70 depicted in FIG. 1. Furthermore, in LiNbO$_3$, where fast active materials allow rapid path changes via the electro-optic effect, the small substrates further limit switches such that this non-dilated optical switch can have dramatic impacts on switching speeds.

Switch density can be increased when more than two modes are allowed to propagate through the use of additional couplers which allow switching of each higher order mode selectively without affecting other modes.

From the foregoing it can be seen that the non-blocking switching arrangement of the invention is not constrained by dilation, and as a consequence, high capacity switches in accordance with the foregoing may be formed on relatively small optic wafers.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the claims. Further, in the claims hereafter, the corresponding structures, materials, acts, and equivalents of all means or step plus function elements are intended to include any structure, material, or acts for performing the functions with other claimed elements as specifically claimed.

What is claimed is:

1. An optical switching circuit comprising:
    a first at least a dual mode optical waveguide path and a second at least a dual mode optical waveguide path;
    a mode selective coupler having first and second inputs and first and second outputs;
    each of said waveguides being connected to one of said inputs;
    a first mode converter in said first waveguide path located therein before said first input to said mode selective coupler; and
    a second mode converter in said second waveguide path located therein before said second input to said mode selective coupler.

2. An optical switching circuit as claimed in claim 1 and further comprising a first signal clean-up member in circuit with said first output of said mode selective coupler.

3. An optical switching circuit as claimed in claim 2 and further comprising a second signal clean-up member in circuit with said second output of said mode selective coupler.

4. An optical switching circuit as claimed in claim 1 and further including a processing member for applying control signals to at least one of said mode converts to effect a mode conversion of signals passing through said mode converter.

5. An optical switching circuit as claimed in claim 4 wherein said processing member is connected to said first mode converter sand to said second mode converter for applying control signals thereto to convert he signals in said mode converter from a fundamental mode to a higher order mode, or from a higher order mode to the fundamental mode.

6. An optical switching circuit as claimed in claim 5 and further comprising first and second signal clean-up members connected to said first and second outputs, respectively, said clean-up members being connected to said processing member for control thereby to eliminate extraneous energy from said outputs.

7. An optical switching circuit as claimed in claim 5, wherein said mode selective coupler is adapted to pair optical energy in the fundamental mode from said first input to said first output, and optical energy in a higher or mode from said first input to said second output.

8. A mode selective optical switching circuit comprising:
    a plurality of input waveguides having signal inputs thereto;
    a plurality of mode selective couplers in a staggered array of rows and columns, each of said couplers having first and second inputs and first and second outputs;
    each of said input waveguides being connected to one of said inputs of one of said mode selective couplers;
    a mode converter in each input waveguide between said signal input and the input to said one of said mode selective couplers; and
    a plurality of outputs, each connected to an output of one of said mode selective couplers by means of an output waveguide.

9. A mode selective optical switching circuit as claimed in claim 8 and further comprising a central processing member connected to each of said mode converters for causing the mode converter to convert optical signals therein from a fundamental mode to a higher order mode and for causing others of said mode converters to convert optical signals therein from a higher order mode to a fundamental mode upon application of a signal from said processing member.

10. A mode selective optical switching circuit as claimed in claim 9 and further comprising a signal clean-up member connected to the outputs of each of said mode selective couplers.

11. A mode selective optical switching circuit as claimed in claim 10 wherein each of said clean-up members is connected to said processing member for receiving control signals therefrom.

12. A mode selective optical switching circuit as claimed in claim 11 wherein each of said clean-up members is a periodic grating filter, the periodicity of which is changeable by signals from said processing member.

13. A method for optical switching, comprising the steps of:
    introducing optical signals along any of a plurality of optical paths having a plurality of optical inputs and a plurality of optical output destination paths;
    routing said optical signals along said plurality of paths to any of a plurality of mode selective optical circuits optically coupled to said plurality of paths between said plurality of optical inputs and said plurality of optical outputs wherein said mode selective optical circuits are arranged in a staggered diagonal configuration creating a plurality of layers and columns and are controlled so that all optical signals have a pathway to the destination path;

converting said optical signals to be switched between paths from a fundamental mode to a higher mode wherein only said higher mode optical signals continuously cross couple between said plurality of layers;

converting said higher mode optical signals back to said fundamental mode at the destination path; and removing any non-mode converted energy remaining on any of said plurality of waveguides.

14. A method for mode selective optical switching as recited in claim 13, further comprising the step of:

controlling mode converters responsive to periodic gratings in said plurality of waveguides wherein said periodic gratings are resonant frequencies operative to cause optical signals to convert from said fundamental mode into said higher mode.

15. A method for mode selective optical switching as recited in claim 13, further comprising the step of:

activating a total number of two mode converters in any waveguide path wherein a first active mode converter initiates a path change and a second mode converter stops further path changes at a destination waveguide path.

* * * * *